US 8,047,246 B2

(12) United States Patent  
Isono

(10) Patent No.: US 8,047,246 B2
(45) Date of Patent: Nov. 1, 2011

(54) APPARATUS FOR CONTROLLING TIRE INFLATION PRESSURE

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 413 days.

(21) Appl. No.: 12/161,816

(22) PCT Filed: Jan. 15, 2007

(86) PCT No.: PCT/JP2007/050852
§ 371 (c)(1),
(2), (4) Date: Jul. 23, 2008

(87) PCT Pub. No.: WO2007/086328
PCT Pub. Date: Aug. 2, 2007

(65) Prior Publication Data
US 2010/0230023 A1 Sep. 16, 2010

(30) Foreign Application Priority Data

Jan. 25, 2006 (JP) ................................. 2006-015847

(51) Int. Cl.
*B60C 23/12* (2006.01)
(52) U.S. Cl. ........................................ 152/417; 152/416
(58) Field of Classification Search .................. 152/415, 152/416, 417, 418
See application file for complete search history.

(56) References Cited

U.S. PATENT DOCUMENTS

| 1,567,779 | A | * | 12/1925 | Wells | ............................ 152/417 |
| 2,177,042 | A | * | 10/1939 | Michael | ........................ 301/38.1 |
| 2,452,527 | A | * | 10/1948 | Hurst | ............................ 152/417 |
| 2,634,783 | A | * | 4/1953 | Turek et al. | .................... 152/417 |
| 5,221,381 | A | | 6/1993 | Hurrell, II | |
| 7,367,371 | B2 | * | 5/2008 | Meydieu et al. | .............. 152/416 |
| 2005/0205182 | A1 | | 9/2005 | Maquaire et al. | |
| 2009/0266460 | A1 | * | 10/2009 | Resare et al. | ................. 152/417 |

FOREIGN PATENT DOCUMENTS

| GB | 2178705 A | * | 2/1987 |
| JP | 61 169304 | | 7/1986 |
| JP | 6-191202 | | 7/1994 |
| JP | 6 507860 | | 9/1994 |
| JP | 11 139118 | | 5/1999 |
| JP | 11 509157 | | 8/1999 |
| JP | 2002 514540 | | 5/2002 |
| JP | 2003-335105 | | 11/2003 |
| JP | 2005-313738 | | 11/2005 |

* cited by examiner

*Primary Examiner* — Russell D Stormer
(74) *Attorney, Agent, or Firm* — Oblon, Spivak, McClelland, Maier & Neustadt, L.L.P.

(57) ABSTRACT

An apparatus for controlling tire inflation pressure includes an outlet side end portion of a supplying passageway opened on an outer circumference of a column-shaped boss portion provided in an axle, and an inlet side end portion of an introducing passageway that is opened on an inner circumference of an annular hub portion provided in a wheel. A wheel is mounted onto the axle. The inner circumference of the annular hub portion is engaged with the outer circumference of the column-shaped boss portion, and thereby the outlet side end portion and the inlet side end portion are communicatively connected to each other air tightly. Thus, easiness in mounting a vehicle wheel assembly relative to the axle can be improved.

4 Claims, 3 Drawing Sheets

APPARATUS FOR CONTROLLING TIRE INFLATION PRESSURE

TECHNICAL FIELD

The present invention relates to an apparatus for controlling tire inflation pressure (a tire inflation pressure introducing apparatus), especially, to an apparatus for controlling tire inflation pressure which is constructed in such a manner that pressurized air supplied from a pressure generating device is introduced into a tire air chamber of a vehicle wheel assembly through at least a supplying passageway provided in an axle and through at least an introducing passageway provided in a wheel of the vehicle wheel assembly removably mounted onto a flange portion of the axle.

BACKGROUND ART

An apparatus for controlling tire inflation pressure of this kind is disclosed, for example, in Japanese Patent Application Laid-Open (kokai) No. Hei 11-139118 (hereinafter referred to as Patent Document 1). In the apparatus for controlling tire inflation pressure described in the Patent Document 1, the pressurized air supplied from the pressure generating device can be introduced (supplied) into the tire air chamber of the vehicle wheel assembly, and accordingly, the air pressure in the tire air chamber can be secured.

Meanwhile, the apparatus for controlling tire inflation pressure described in the Patent Document 1 is constructed in such a manner that the supplying passageway provided in the axle is communicatively connected to the introducing passageway provided in the wheel of the vehicle wheel assembly through an air tube. Therefore, when the vehicle wheel assembly is being mounted onto the flange portion of the axle, it is required to relatively adjust a position of the supplying passageway provided in the axle to a position of the introducing passageway provided in the wheel of the vehicle wheel assembly, and to communicatively connect the supplying passageway provided in the axle to the introducing passageway provided in the wheel of the vehicle wheel assembly through the air tube, leaving room for improvement due to difficulties in mounting.

DISCLOSURE OF THE INVENTION

The present invention is intended to solve the problems described above to provide an apparatus for controlling tire inflation pressure constructed in such a manner that pressurized air supplied from a pressure generating device is introduced into a tire air chamber of a vehicle wheel assembly through a supplying passageway provided in an axle and through an introducing passageway provided in a wheel of the vehicle wheel assembly which is removably mounted onto a flange portion of the axle, characterized in that a column-shaped boss portion which projects in an outward (outboard) direction of a vehicle from the flange portion of the axle to be capable of fitting with an annular (or circular-shaped) hub portion of the wheel is provided as a portion of the axle, and an outlet side end portion of the supplying passageway is opened on an outer circumference of this column-shaped boss portion and, further, an inlet side end portion of the introducing passageway is opened on an inner circumference of the annular hub portion, and by (or when) mounting the wheel of the vehicle wheel assembly onto the axle, the inner circumference of the annular hub portion in the wheel of the vehicle wheel assembly is fitted with the outer circumference of the column-shaped boss portion in the axle, and thereby the outlet side end portion of the supplying passageway and the inlet side end portion of the introducing passageway are communicatively connected each other air tightly.

In this apparatus for controlling tire inflation pressure, the outlet side end portion of the supplying passageway is opened on the outer circumference of the column-shaped boss portion in the axle and, further, the inlet side end portion of the introducing passageway is opened on the inner circumference of the annular hub portion in the wheel of the vehicle wheel assembly, and by (or when) mounting the wheel of the vehicle wheel assembly onto the flange portion of the axle, the inner circumference of the annular hub portion in the wheel of the vehicle wheel assembly is fitted with the outer circumference of the column-shaped boss portion in the axle, and thereby the outlet side end portion of the supplying passageway and the inlet side end portion of the introducing passageway are communicatively connected each other air tightly. Therefore, when the vehicle wheel assembly is being mounted onto the flange portion of the axle, it is possible to improve easiness in mounting the vehicle wheel assembly onto the flange portion of the axle, compared with the conventional apparatus wherein the supplying passageway must be communicatively connected with the introducing passageway through the air tube.

In this case, it is preferable that a plurality of the outlet side end portions of the supplying passageways and a plurality of the inlet side end portions of the introducing passageways be provided and that the outlet side end portions and the inlet side end portions be arranged at equiangular intervals so as to mach with (or so as to be in accordance with) a mounting phase of the vehicle wheel assembly relative to the axle (i.e., relative angular positions between the vehicle wheel assembly and the axle, which is typically determined by intervals in the circumferential direction of hub bolts mounted onto the flange portion of the axle). In this case, when the vehicle wheel assembly is being mounted onto the flange portion of the axle, it is possible to further improve the easiness in mounting (or assembling) the vehicle wheel assembly onto the flange portion of the axle, since relative adjustments are automatically performed between positions of the outlet side end portions of the supplying passageways and the inlet side end portions of the introducing passageways.

Also, in the practice of the present invention, it is preferable that an annular communicating passageway, which communicates the outlet side end portion of the supplying passageway with the inlet side end portion of the introducing passageway, be provided at a fitting portion between the outer circumference of the column-shaped boss portion in the axle and the inner circumference of the annular hub portion in the wheel of the vehicle wheel assembly. In this case, even if the number of the outlet side end portion of the supplying passageway is one and the number of the inlet side end portion of the introducing passageway is one, it is not required to relatively adjust the position of the outlet side end portion of the supplying passageway to the position of the inlet side end portion of the introducing passageway. The reason is that even if the positions of the outlet side end portion of the supplying passageway and of the inlet side end portion of the introducing passageway are not relatively adjusted in mounting the vehicle wheel assembly onto the flange portion of the axle, the outlet side end portion of the supplying passageway can be communicated with the inlet side end portion of the introducing passageway through the annular communicating passageway. Accordingly, it is possible to favorably improve the easiness in mounting the vehicle wheel assembly onto the flange portion of the axle.

Moreover, when a plurality of the outlet side end portions of the supplying passageway and a plurality of the inlet side end portions of the introducing passageway are provided, the similar effects can be expected since it is not required to adjust relative positions between the outlet side end portions of the supplying passageways and the inlet side end portions of the introducing passageways in a similar manner as described above. At the same time, only two of sealing members are required (i.e., it is necessary to have only one annular (or ring-shaped) sealing member provided along an outside of the vehicle of the annular communicating passageway and only one annular (or ring-shaped) sealing member provided along an inside of the vehicle of the annular communicating passageway), regardless of the number of the outlet side end portions of the supplying passageways and the inlet side end portions of the introducing passageways (i.e., if each of the number is four and the communicating passageway is not provided, four sealing members are required in total). Thus, the apparatus can have a simple structure.

Furthermore, in the practice of the present invention, it is also preferable that a sealing means be provided in the inlet side end portion of the introducing passageway, the sealing means opening the introducing passageway by (or when) mounting the vehicle wheel assembly onto the axle and closing the introducing passageway by (or when) removing the vehicle wheel assembly from the axle. In this case, the sealing means may be a check valve comprising a ball valve. In this instance, even when the vehicle wheel assembly is removed from the axle, the air pressure in the tire air chamber is maintained, since the sealing means air tightly closes the introducing passageway provided in the wheel of the vehicle wheel assembly.

BEST MODE FOR CARRYING OUT THE INVENTION

Figure 1:
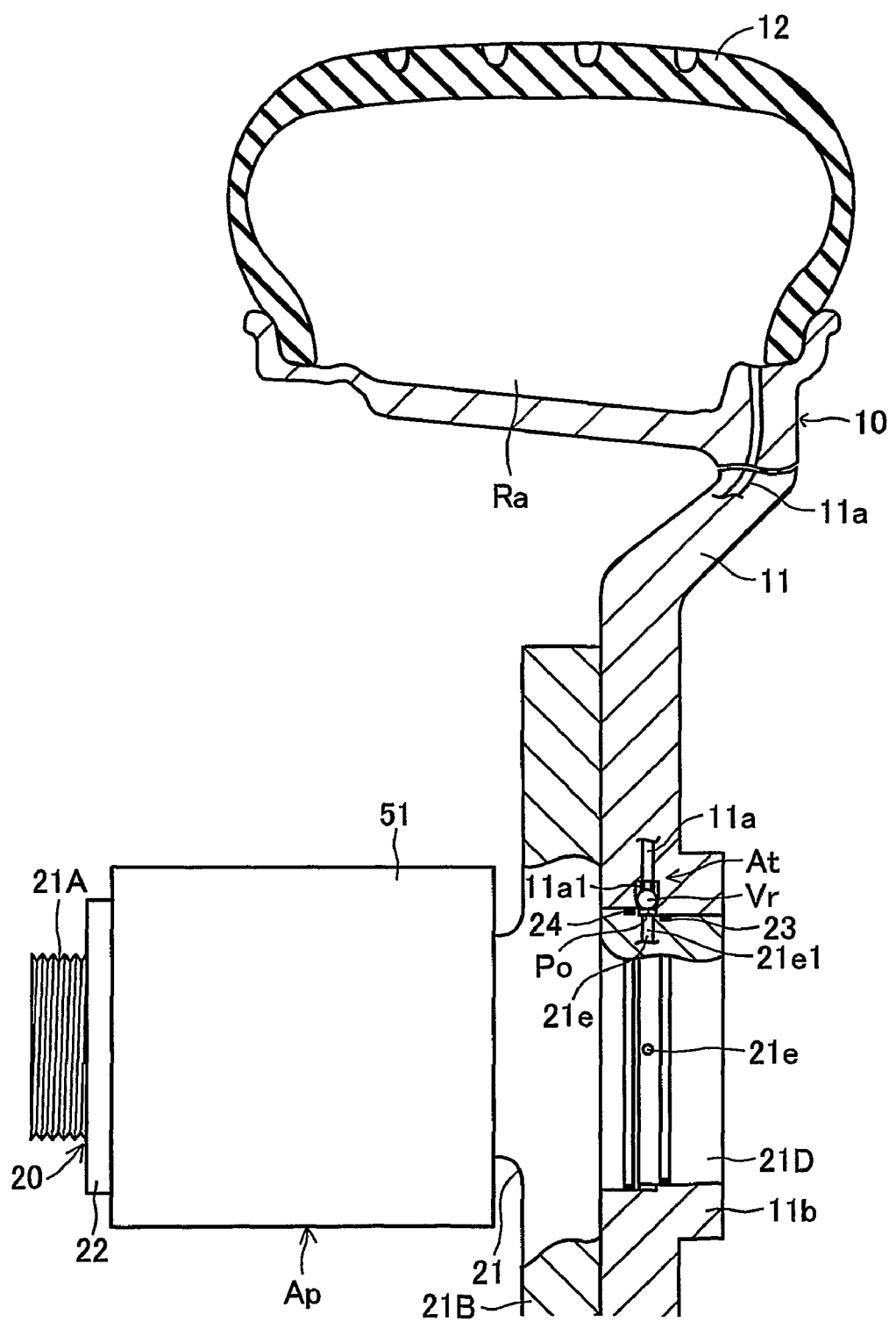
FIG. 1 is a fragmentary, cutaway front view schematically showing an embodiment of an apparatus for controlling tire inflation pressure according to the present invention.
Figure 2:
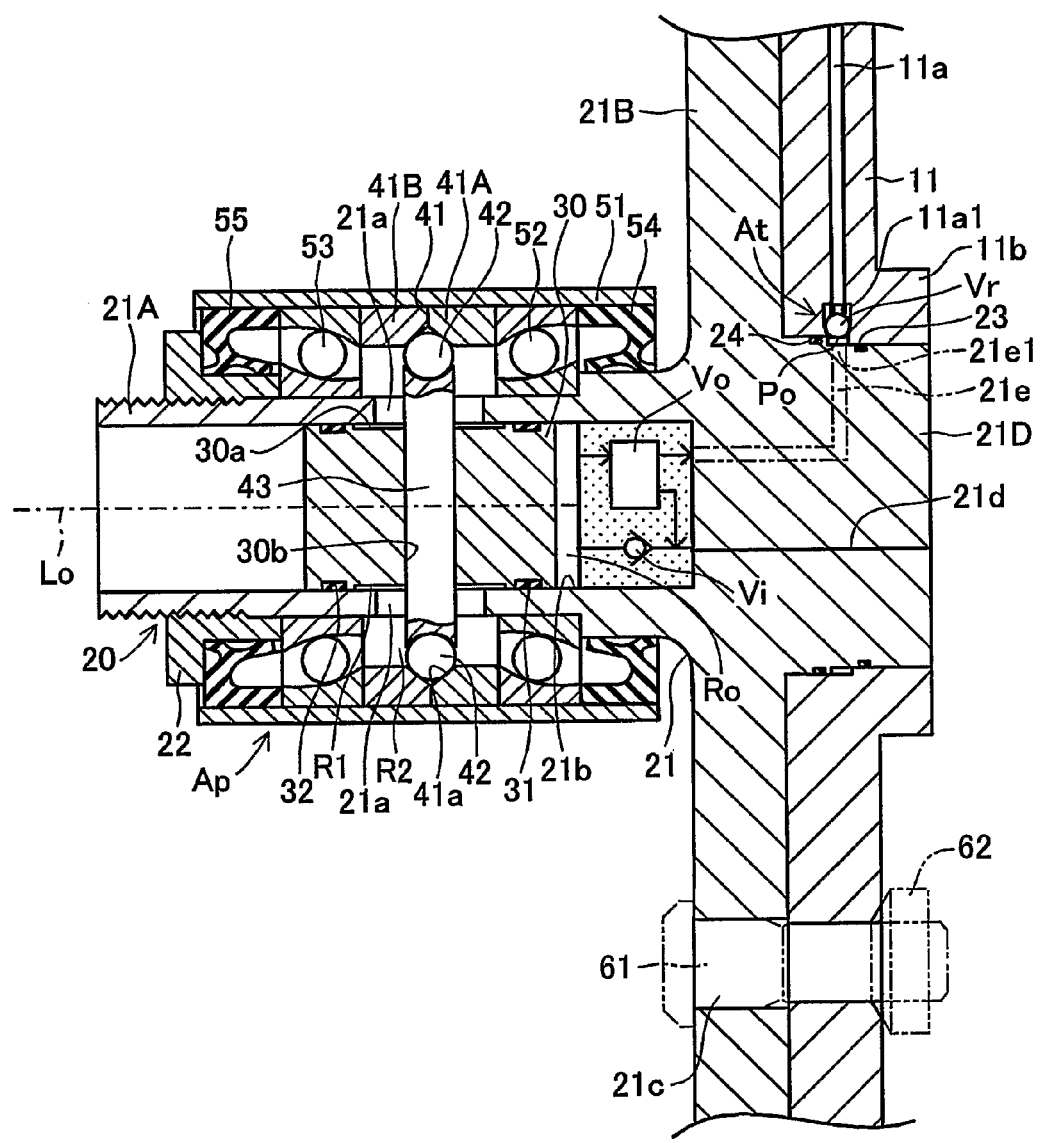
FIG. 2 is an enlarged sectional view of the apparatus for controlling tire inflation pressure and a pressure generating device shown in FIG. 1.

An embodiment according to the present invention will next be described based on the drawings. FIGS. 1 and 2 schematically show a pressure generating device Ap capable of generating pressurized air with a rotation of an axle 20 and an apparatus At for controlling tire inflation pressure (a tire inflation pressure introducing apparatus) which introduces the pressurized air supplied from the pressure generating device Ap into a tire air chamber Ra formed by a wheel 11 and a tire 12 of a vehicle wheel assembly 10. The vehicle wheel assembly 10 is removably mounted onto a flange portion 21B of the axle 20 in the wheel 11. It should be noted that the apparatus At for controlling tire inflation pressure is constructed in such a manner that the pressurized air supplied from the pressure generating device Ap is introduced into the tire air chamber Ra of the vehicle wheel assembly 10 through supplying passageways 21e provided in the axle 20 and introducing passageways 11a provided in the wheel 11 of the vehicle wheel assembly 10.

The pressure generating device Ap comprises a cylindrical support portion 51 which is a part of a knuckle as a supporting member, the axle 20 as a rotating member and a column-shaped piston 30 as a pump-operating member, and further comprises a cam member 41 and cam followers 42 serving as a motion converting mechanism which converts a rotational motion (or movement) of the axle 20 against the cylindrical support portion 51 into a reciprocal motion (or movement) of the piston 30, and a rod 43 which rotatably supports the cam followers 42.

The cylindrical support portion 51 is formed to have a cylindrical shape whose center is along an axis line Lo and is incapable of rotating around the axis line Lo. Inside the cylindrical support portion 51, the axle 20 is liquid tightly supported rotatably around the axis line Lo through a pair of bearings 52, 53 and a pair of annular (or ring-shaped) sealing members 54, 55. The pair of bearings 52, 53 is arranged with a predetermined distance in an axial direction (in a direction along the axis line Lo) and interposed between the cylindrical support portion 51 and the axle 20 in such a manner as to sandwich the cam member 41 in the axial direction to allow the axle 20 to rotate around the cylindrical support portion 51, namely, the knuckle. The pair of annular sealing members 54, 55 are arranged with a predetermined distance in the axial direction and interposed between the cylindrical support portion 51 and the axle 20 in such a manner as to sandwich the cam member 41 and both of the bearings 52, 53 in the axial direction to thereby provide liquid tight seal between the cylindrical support portion 51 and the axle 20.

The axle 20 comprises an axle body 21 and a sleeve 22 screwed liquid tightly on an outer circumference of the axle body 21 at its inner end portion of the vehicle (i.e., at an inboard end of the axle body 21). The axle body 21 comprises a rotating axis portion 21A and the flange portion 21B, and further comprises a column-shaped boss portion 21D which projects in an outward (or outboard) direction of a vehicle from the flange portion 21B to be capable of fitting with an annular (or circular-shaped) hub portion 11b of the wheel 11 in the vehicle wheel assembly 10. A pair of axial direction-long holes 21a (i.e., holes 21a elongated along the axial direction) and a cylinder bore 21b are formed in the rotating axis portion 21A. Mounting-hole portions 21c to mount the vehicle assembly wheel 10 are formed in the flange portion 21B. An intake passageway 21d and supplying passageways 21e are formed in the column-shaped boss portion 21D.

The pair of axial direction-long holes 21a forms a guiding means which enables the piston 30, the cam followers 42, and the rod 43 to rotate together with the axle 20 and to reciprocate in the axial direction. The axial direction-long holes 21a are formed so as to be arranged at (or with) an interval of 180 degrees along the circumferential direction of the rotating axis portion 21A in the axle 20. The cylinder bore 21b accommodates the piston 30 and forms a pump chamber Ro in the rotating axis portion 21A together with the piston 30.

The mounting-hole portions 21c are formed so as to be arranged at four positions at intervals of 90 degrees along the circumferential direction. Hub bolts 61 are fitted (or inserted) into the mounting-hole portions 21c to be fixed in such a manner as to penetrate the mounting-hole portions 21c (refer to FIG. 2). It should be noted that the vehicle wheel assembly 10 is fastened onto the axle 20 with the four hub bolts 61 and hub nuts 62 (refer to FIG. 2) screwed onto each hub bolt 61.

The intake passageway 21d is intended to introduce air into the pump chamber Ro. An intake check valve Vi is interposed in the intake passageway 21d. The supplying passageways 21e are intended to supply the pressurized air discharged from the pump chamber Ro into the introducing passageways 11a provided in the wheel 11 of the vehicle wheel assembly 10. A control valve Vo is interposed in each of the supplying passageways 21e.

The control valve Vo is a change-over valve which operates depending on the pressure in the supplying passageways 21e. The control valve Vo causes the pump chamber Ro to communicate with the supplying passageways 21e while causing the pump chamber Ro to be disconnected with the intake passageway 21d, when the pressure in each of the supplying passageways 21e is less than a predetermined set value. The control valve Vo causes the pump chamber Ro to communicate with the intake passageway 21d while causing the pump chamber Ro to be disconnected with the supplying passageways 21e, when the pressure in each of the supplying passageways 21e is equal to or larger than the predetermined set value.

The piston 30 is inserted in the cylinder bore 21b of the rotating axis portion 21A in the axle 20 through a pair of annular (or ring-shaped) sealing members 31, 32 and is configured (or mounted) in such a manner as to be capable of rotating concentrically together with the rotating axis portion 21A of the axle 20 and to be capable of reciprocating in the axial direction of the rotating axis portion 21A of the axle 20. Also, an annular groove 30a and a through-hole 30b extending in a radial direction of the piston 30 are formed in the piston 30. The pair of annular sealing members 31, 32 is disposed at a predetermined distance in the axial direction and interposed between the piston 30 and the rotating axis portion 21A at end portions in the axial direction of the piston 30. The pair of annular sealing members 31, 32 provides air and liquid tight seals between the piston 30 and the rotating axis portion 21A.

The annular groove 30a is formed on an outer circumference of the piston 30 between the pair of annular sealing members 31, 32 and forms an annular space R1 between the piston 30 and the rotating axis portion 21A. This annular space R1 is communicated with an annular space R2 formed between the pair of annular sealing members 54, 55 through each axial direction-long hole 21a formed in the rotating axis portion 21A. The volume of each of the annular spaces R1, R2 does not vary, even when the piston 30 reciprocates in the axial direction. The annular spaces R1, R2 are sealed by the four sealing members 54, 55, 31, 32. Also, annular spaces R1, R2 or the like form oil chambers which accommodate a predetermined amount of lubricant. This oil chambers accommodate the bearings 52, 53, the cam member 41, the cam followers 42 or the like.

The cam member 41 is a cylindrical cam integrally (impossible to move in the axial direction and to rotate) provided in the cylindrical support portion 51. The cam member 41 comprises a pair of cam sleeves 41A, 41B which are connected each other in the axial direction and is concentrically arranged about the rotating axis portion 21A. Also, the cam member 41 has an annular cam portion 41a which forms a cam groove whose track fluctuates in the axial direction. The cam followers 42 are fitted with the cam groove. The cam portion 41a has a cam surface which receives load in the axial direction from the cam followers 42 (i.e., load in the horizontal direction in FIG. 2) and load in the radial direction (i.e., load in the vertical direction in FIG. 2). The cross-sectional shape of this cam surface is V-shaped. The cam surface is configured so as to fluctuate with even-numbered cycles (e.g., two cycles) in the circumferential direction of the rotating axis portion 21A.

The cam followers 42 are balls rotatably mounted at outer ends in the radial direction of the piston of the rod 43. The cam followers 42 are engaged with the cam portion 41a (i.e., cam groove) at end portions in the radial direction of the piston which is perpendicular to the axis line Lo and are capable of moving in the axial direction (in the horizontal direction in FIG. 2) together with the rod 43 by rotating about the cam member 41. The rod 43 is a load transfer movably mounted in the through-hole 30b in the radial direction of the piston 30 (in the axial direction of the through-hole 30b). The rod 43 penetrates the axial direction-long holes 21a in such a manner as to be capable of moving in the axial direction and to be incapable of moving in the rotational direction.

Meanwhile, the apparatus At for controlling tire inflation pressure according to this embodiment is constructed such that, the outlet side end portions 21e1 of the supplying passageways 21e are opened on the outer circumference of the column-shaped boss portion 21D in the axle 20, and further, the inlet side end portions 11a1 of the introducing passageways 11a are opened on the inner circumference of the annular hub portion 11b in the wheel 11 of the vehicle wheel assembly 10, and by (or when) mounting the wheel 11 of the vehicle wheel assembly 10 onto the axle 20, the inner circumference of the annular hub portion 11b in the wheel 11 of the vehicle wheel assembly 10 is fitted with the outer circumference of the column-shaped boss portion 21D in the axle 20, and thereby the outlet side end portions 21e1 of the supplying passageways 21e and the inlet side end portions 11a1 of the introducing passageways 11a are communicatively connected each other air tightly.

The outlet side end portions 21e1 of the supplying passageways 21e are formed at four positions and arranged at equiangular intervals so as to match with a mounting phase of the vehicle wheel assembly 10 relative to the axle 20 (i.e., the intervals of 90 degrees in the circumferential direction). The inlet side end portions 11a1 of the introducing passageways 11a are formed at four positions at the intervals of 90 degrees in the circumferential direction in a similar manner as the outlet side end portions 21e1 of the supplying passageways 21e so as to face respectively to (or respectively be opposed to) the outlet side end portions 21e1 of the supplying passageways 21e, as shown in FIG. 2.

Also, in this embodiment, at a fitting portion between the outer circumference of the column-shaped boss portion 21D in the axle 20 and the inner circumference of the annular hub portion 11b in the wheel 11 of the vehicle wheel assembly 10, an annular communicating passageway Po is formed which communicates the outlet side end portions 21e1 of the supplying passageways 21e with the inlet side end portions 11a1 of the introducing passageways 11a. Further, sealing members 23, 24 for sealing the annular communicating passageway Po air tightly are mounted onto the outer circumference of the column-shaped boss portion 21D. It should be noted that a first step-like portion is provided on the outer circumference of the column-shaped boss portion 21D in the axle 20. The first step-like portion is formed to have a smaller-diameter portion around its outboard end portion of the vehicle. A second step-like portion is provided on the inner circumference of the annular hub portion 11b in the wheel 11 of the vehicle wheel assembly 10. The second step-like portion is formed to have a smaller-diameter portion around its outboard end portion of the vehicle. The annular communicating passageway Po is formed by these first and second step-like portions.

Figure 3A:
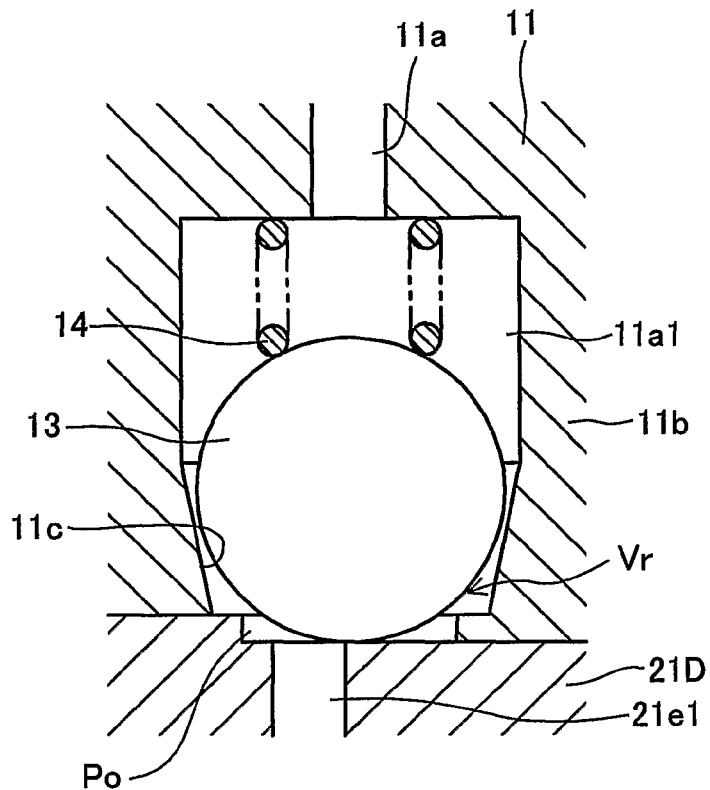
FIGS. 3A and 3B are enlarged sectional views showing the operation (function) of a check valve mounted in a wheel of a vehicle wheel assembly.
Figure 3B:
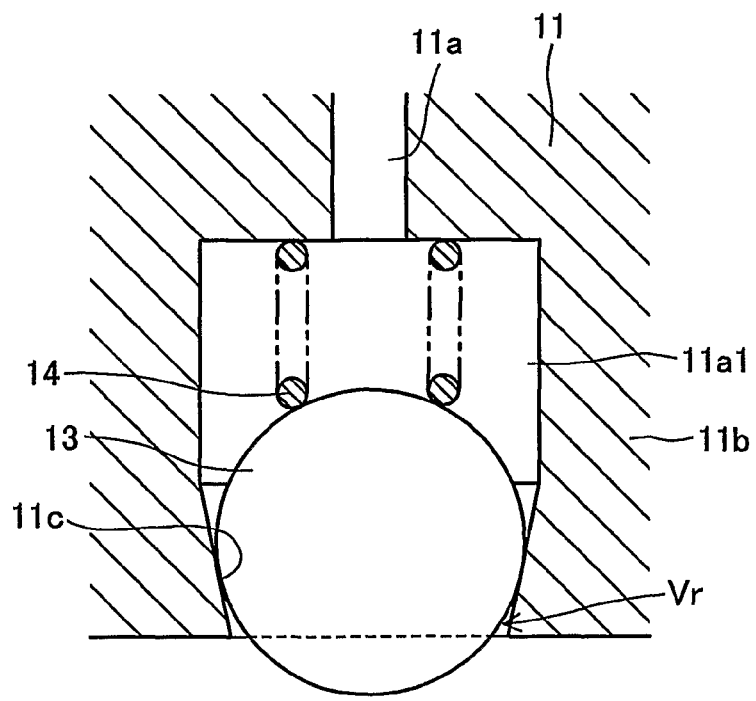

Furthermore, in this embodiment, a check valve Vr is provided which comprises a ball valve 13 and a spring 14 in each of the inlet side end portions 11a1 of the introducing passageways 11a. Each of the check valves Vr forms a sealing means which opens (or releases) the introducing passageway 11a by (or when) mounting the vehicle wheel assembly 10 onto the axle 20 and which seals (or closes air tightly) the introducing passageway 11a by (or when) removing the vehicle wheel assembly 10 from the axle 20. The open (or release) of the introducing passageway 11a is accomplished by the event that the ball valve 13 is caused to depart from a valve seat 11b formed on the introducing passageway 11a when the ball valve 13 is pushed to move against the springs 14 by engaging with the outer circumference of the first smaller-diameter portion of the column-shaped boss portion 21D, as shown in FIG. 3A. Also, the sealing (or closing) of the introducing passageway 11a is accomplished by the event that the ball valve 13 is caused to be pushed and moved by the springs 14 to seat on the valve seat 11b formed on the introducing passageway 11a when the ball valve 13 departs from the outer circumference of the small-diameter portion of the column-shaped boss portion 21D, as shown in FIG. 3B.

In this embodiment constructed as described above, when the axle 20 rotates about the cylindrical support portion 51, the piston 30, the rod 43 and the cam followers 42 rotate integrally with the axle 20 so as to rotate relatively to the cam member 41, thereby moving in the axial direction. Accordingly, the rotational motion of the axle 20 can be converted into the reciprocal motion of the piston 30, which is capable of increasing/decreasing the volume of the pump chamber Ro. Thus, the air can be sucked into the pump chamber Ro through the intake passageway 21d which interposes the intake check valve Vi and discharged from the pump chamber Ro through the supplying passageway 21e which interposes the control valve Vo. The discharged air (pressurized air) can be supplied into the tire air chamber Ra of the vehicle wheel assembly 10 mounted onto the axle 20.

Meanwhile, in the apparatus At for controlling tire inflation pressure according to this embodiment, the outlet side end portions 21e1 of the supplying passageways 21e are opened on the outer circumference of the column-shaped boss portion 21D of the axle 20, and further, the inlet side end portions 11a1 of the introducing passageways 11a are opened on the inner circumference of the annular hub portion 11b in the wheel 11 of the vehicle wheel assembly 10, and by (or when) mounting the wheel 11 of the vehicle wheel assembly 10 onto the axle 20, the inner circumference of the annular hub portion 11b in the wheel 11 of the vehicle wheel assembly 10 is fitted with the outer circumference of the column-shaped boss portion 21D in the axle 20, and thereby the outlet side end portions 21e1 of the supplying passageways 21e and the inlet side end portions 11a1 of the introducing passageways 11a are communicatively connected each other air tightly. Accordingly, when the vehicle wheel assembly 10 is being mounted onto the flange portion 21B of the axle 20, it is possible to improve easiness in mounting the vehicle wheel assembly 10 onto the flange portion 21B of the axle 20, compared with the conventional apparatus wherein the supplying passageway provided in the axle must be communicatively connected with the introducing passageway provided in the wheel of the vehicle wheel assembly through the air tube.

Also, in this embodiment, the outlet side end portions 21e1 of the supplying passageways 21e and the inlet side end portions 11a1 of the introducing passageways 11a are provided at (or in) four positions respectively and are arranged at equiangular intervals so as to match with (or so as to be in accordance with) a mounting phase of the vehicle wheel assembly 10 relative to the axle 20. Therefore, when the vehicle wheel assembly 10 is being mounted onto the flange portion 21B of the axle 20, the relative adjustments are automatically performed between the positions of the outlet side end portions 21e1 of the supplying passageways 21e and the inlet side end portions 11a1 of the introducing passageways 11a.

Moreover, in this embodiment, at the fitting portion between the outer circumference of the column-shaped boss portion 21D in the axle 20 and the inner circumference of the annular hub portion 11b in the wheel 11 of the vehicle wheel assembly 10, the annular communicating passageway Po is provided which communicates the outlet side end portions 21e1 of the supplying passageways 21e with the inlet side end portions 11a1 of the introducing passageways 11a, and further, the annular sealing members 23, 24 for sealing the annular communicating passageway Po air tightly are mounted onto the outer circumference of the column-shaped boss portion 21D.

Accordingly, when the vehicle wheel assembly 10 is being mounted onto the flange portion 21B of the axle 20, it is not required to relatively adjust the positions of the outlet side end portions 21e1 of the supplying passageways 21e to the positions of the inlet side end portions 11a1 of the introducing passageways 11a. The reason is that even if the positions of the outlet side end portions 21e1 of the supplying passageways 21e and of the inlet side end portions 11a1 of the introducing passageways 11a are not relatively adjusted, the outlet side end portions 21e1 of the supplying passageways 21e can be communicated with the inlet side end portions 11a1 of the introducing passageways 11a through the annular communicating passageway Po. Moreover, only two of sealing members are required (i.e., it is necessary to have only one annular (or ring-shaped) sealing member 23 provided along an outside of the vehicle of the annular communicating passageway Po and only one annular (or ring-shaped) sealing member 24 provided along an inside of the vehicle of the annular communicating passageway Po), otherwise four sealing members are required in order to seal each communicatively connected portion air tightly, if the number of the outlet side end portions 21e1 of the supplying passageways 21e and the inlet side end portions 11a1 of the introducing passageways 11a is four respectively. Thus, the apparatus according to the present invention can have a simple structure.

Furthermore, in this embodiment, the check valves Vr are provided in the inlet side end portions 11a1 of the introducing passageways 11a. Each of the check valves Vr opens the introducing passageway 11a by (or when) mounting the vehicle wheel assembly 10 onto the axle 20 and closes the introducing passageway 11a air tightly by (or when) removing the vehicle wheel assembly 10 from the axle 20. Accordingly, even when the vehicle wheel assembly 10 is removed from the axle 20, the air pressure in the tire air chamber Ra is maintained, since the check valve Vr air tightly closes the introducing passageway 11a provided in the wheel 11 of the vehicle wheel assembly 10.

In the embodiment described above, four of the outlet side end portions 21e1 of the supplying passageways 21e and four of the inlet side end portions 11a1 of the introducing passageways 11a are provided. However, the number of the outlet side end portions 21e1 and of the inlet side end portions 11a may not be limited to four, and a single outlet side end portion 21e1 and a single inlet side end portion 11a may be provided.

Further, it should be noted that, in place of the supplying passageways 21e, a single common supplying passageway and four of branch supplying passageways may be formed. The four of branch supplying passageways, each of which has the outlet side portion, are merged and communicatively connected to the single common supplying passageway. The single common supplying passageway is constructed so as to communicate the pump chamber Ro with each of the four branch supplying passageways. In this case, a single control valve Vo may be provided in the single common supplying passageway.

Moreover, in the embodiment described above, the first step-like portion is provided on the outer circumference of the column-shaped boss portion 21D in the axle 20, the first step-like portion being formed to have the smaller-diameter portion around its outboard end portion of the vehicle. The second step-like portion is provided on the inner circumference of the annular hub portion 11b in the wheel 11 of the vehicle wheel assembly 10, the second step-like portion being formed to have the smaller-diameter portion around the outboard end portion of the vehicle. The annular communicating passageway Po, which communicates the outlet side end portions 21e1 of the supplying passageways 21e with the inlet side end portions 11a1 of the introducing passageways 11, is formed at the fitting portion between the outer circumference of the column-shaped boss portion 21D in the axle 20 and the inner circumference of the annular hub portion 11b in the wheel 11 of the vehicle wheel assembly 10 by these first and second step-like portions. However, the apparatus may be implemented by forming an annular communicating groove on the outer circumference of the column-shaped boss portion 21D in the axle 20, and causing the annular communicating groove to communicate the outlet side end portions 21e1 of the supplying passageways 21e with the inlet side end portions 11a1 of the introducing passageways 11a.

The invention claimed is:

1. An apparatus for controlling tire inflation pressure in which pressurized air supplied from a pressure generating device is introduced into a tire air chamber of a vehicle wheel assembly through a supplying passageway provided in an axle and an introducing passageway provided in a wheel of the vehicle wheel assembly which is removably mounted onto a flange portion of the axle, comprising:
    sealing means provided in the inlet side end portion of the introducing passageway, the sealing means opening the introducing passageway to air when the vehicle wheel assembly is mounted onto the axle and closing the introducing passageway air tightly when the vehicle wheel assembly is removed from the axle,
    wherein a column-shaped boss portion which projects in an outward direction of a vehicle from the flange portion of the axle is provided as a portion of the axle so as to be capable of fitting with an annular hub portion of the wheel, and an outlet side end portion of the supplying passageway has an opening on an outer circumference of the column-shaped boss portion, an inlet side end portion of the introducing passageway has an opening on an inner circumference of the annular hub portion, and by mounting the wheel of the vehicle wheel assembly onto the axle, the inner circumference of the annular hub portion in the wheel of the vehicle wheel assembly is fitted with the outer circumference of the column-shaped boss portion in the axle, and thereby the outlet side end portion of the supplying passageway and the inlet side end portion of the introducing passageway are communicatively connected to each other air tightly;
    wherein the apparatus for controlling tire inflation pressure comprises a plurality of the outlet side end portions of the supplying passageways and a plurality of the inlet side end portions of the introducing passageways so that the outlet side end portions and the inlet side end portions are arranged at equiangular intervals so as to match with a mounting phase of the vehicle wheel assembly relative to the axle.

2. An apparatus for controlling tire inflation pressure according to claim 1, wherein the sealing means includes a check valve having a ball valve.

3. An apparatus for controlling tire inflation pressure in which pressurized air supplied from a pressure generating device is introduced into a tire air chamber of a vehicle wheel assembly through a supplying passageway provided in an axle and an introducing passageway provided in a wheel of the vehicle wheel assembly which is removably mounted onto a flange portion of the axle, comprising:
    sealing means provided in the inlet side end portion of the introducing passageway, the sealing means opening the introducing passageway to air when the vehicle wheel assembly is mounted onto the axle and closing the introducing passageway air tightly when the vehicle wheel assembly is removed from the axle,
    wherein a column-shaped boss portion which projects in an outward direction of a vehicle from the flange portion of the axle is provided as a portion of the axle so as to be capable of fitting with an annular hub portion of the wheel, and an outlet side end portion of the supplying passageway has an opening on an outer circumference of the column-shaped boss portion, an inlet side end portion of the introducing passageway has an opening on an inner circumference of the annular hub portion, and by mounting the wheel of the vehicle wheel assembly onto the axle, the inner circumference of the annular hub portion in the wheel of the vehicle wheel assembly is fitted with the outer circumference of the column-shaped boss portion in the axle, and thereby the outlet side end portion of the supplying passageway and the inlet side end portion of the introducing passageway are communicatively connected to each other air tightly;
    wherein at a fitting portion between the outer circumference of the column-shaped boss portion in the axle and the inner circumference of the annular hub portion in the wheel of the vehicle wheel assembly, an annular communicating passageway is formed which communicates the outlet side end portion of the supplying passageway with the inlet side end portion of the introducing passageway.

4. An apparatus for controlling tire inflation pressure according to claim 3, wherein the sealing means including a check valve having a ball valve.

* * * * *